3,654,078
METHOD FOR PRODUCING L-GLUTAMIC ACID
Yoshio Nakao and Masakazu Kikuchi, Osaka, Masaru Suzuki, Hyogo, and Muneharu Doi, Osaka, Japan, assignors to Takeda Chemical Industries, Ltd., Osaka, Japan
No Drawing. Filed Apr. 15, 1970, Ser. No. 28,973
Claims priority, application Japan, Apr. 15, 1969, 44/29,103
Int. Cl. C12b 1/00
U.S. Cl. 195—28 R   15 Claims

ABSTRACT OF THE DISCLOSURE

L-glutamic acid is produced by culturing a microorganism requiring a glycerol compound for growth and belonging to the genus Corynebacterium.

The present invention relates to a method for the production of L-glutamic acid by the cultivation of L-glutamic acid-producing microorganisms. More specifically, the present invention relates to an improved process for producing L-glutamic acid, which comprises culturing an L-glutamic acid-producing microorganism which requires glycerol for its growth in a culture medium containing normal paraffin as the main carbon source.

There are many microorganisms capable of producing L-glutamic acid through fermentation with normal paraffin. However, these microorganisms retain thus produced L-glutamic acid in the cells and do not discharge the L-glutamic acid from the cells into the culture broth. Therefore these microorganisms give only poor yields of L-glutamic acid.

It has been reported that the yield of L-glutamic acid is increased by treating some microorganisms with penicillins during the fermentation process. However, the known method is still unsatisfactory from the standpoint of the yield. In addition, the time of addition and the amount of penicillin so added play roles of paramount importance, and the decision of these conditions is very difficult. Furthermore, various by-products occur in the course of the fermentation process, and it is difficult to separate them from the desired L-glutamic acid.

The present inventors have now found:

(1) That there can be obtained L-glutamic acid-producing microorganisms which require glycerol for their growth and grow in a medium containing normal paraffin as a main carbon source.

(2) That those microorganisms, endowed with glycerol requirement for their growth, can accumulate L-glutamic acid in the culture broth in a high yield through fermentation process from normal paraffin.

Therefore it is the main object of the present invention to provide an industrially feasible method for the production of L-glutamic acid from normal paraffin.

The object is realized by culturing an L-glutamic acid-producing microorganism of the genus Corynebacterium requiring glycerol for its growth, in culture medium containing normal paraffin as a main carbon source as well as nitrogen source and inorganic salts in addition to a small amount of glycerol compound under aerobic conditions until a substantial amount of L-glutamic acid is produced. The thus produced L-glutamic acid is thereafter recovered from the cultured broth.

It is rather against expectation of those skilled in the art that there exist such microorganisms which require glycerol for their growth, since glycerol is one of the most important substances in the metabolic pathway of the microorganisms, and it has been believed that it is exceedingly difficult to intercept the metabolic pathway at the point of glycerol.

However, such microorganisms, i.e. those to be employed in the method of the present invention, can be obtained by subjecting any of known L-glutamic acid-producing strains to per-se known mutagenic methods. Such methods are exemplified by irradiation with ultraviolet or X-rays, and treatment with chemical mutagens such as N-methyl-N'-nitro-N-nitrosoguanidine or nitrous acid. The characteristic of requiring glycerol in thus treated microorganism is confirmed in a manner similar to routine auxotrophic mutant-screening procedures by checking that while the microorganism does not grow in a minimal medium containing no glycerol, the same microorganism can grow when the medium is supplemented with glycerol.

Thus obtained microorganism is usually in complete agreement with the corresponding parent microorganism in general microbiological characteristics other than the glycerol requirement for their growth.

The parent strains from which the auxotrophic mutants are to be derived are widely distributed in nature, particularly among those belonging to, for instance, the genus Corynebacterium, more particularly, e.g. *Corynebacterium alkanolyticum*, *Corynebacterium hydrocarboclastus*, and the like.

It is to be noted that *Corynebacterium alkanolyticum* is a novel species established by the present inventors.

The *Corynebacterium alkanolyticum* has the following characteristics, by which the microorganism is determined to belong to a novel species according to the description in the Manual of Microbiological Methods, Society of American Bacteriologists (1957).

(I) Morphological characteristics

Straight to slightly curved rods, some occurring V shaped forms, with metachromatic granules, 0.8 to 1.0 by 1.5 to 4.0 microns showing pleomorphism. Non-sporulating. Non-motile. Gram-positive. Acid fast stain negative.

(II) Cultural characteristics (1) Nutrient agar plate colonies: creamy or pale orange-colored, undulate, raised. Spots like.
(2) Nutrient agar slant: creamy or pale orange-colored filiform growth.
(3) Nutrient broth: Slightly turbid with sediment. No pellicle.
(4) Nutrient agar stab: Surface growth. Filiform.
(5) Potato: Creamy, slightly brownish orange-colored.

(III) Physiological characteristics
(1) pH: 5.0 to 9.0
(2) Temperature: 15° to 37° C.
(3) $O_2$ conditions: aerobic
(4) Gelatin stab: no liquefaction
(5) Starch: not hydrolized
(6) Cellulose: not attacked
(7) Urease: produced
(8) Indole: not produced
(9) Ammonia in peptone media: not produced
(10) Hydrogen sulfide: produced
(11) Nitrites from nitrates: produced
(12) Litmus milk: unchanged
(13) Acetylmethylcarbinol: not produced
(14) Methyl red test: negative
(15) Catalase: positive
(16) Acids from fructose
(17) No acids from glucose, galactose, mannose, D-xylose, D-arabinose, sucrose, lactose, maltose, mannitol, sorbitol and glycerol
(18) Assimilation: glucose, gluconate, citrate, succinate, propionate, pyruvate, acetate, undecane, dodecane, tridecane, tetradecane, pentadecane, hexadecane, heptadecane and octadecene
(19) Unassimilation: α-ketoglutaric acid, acetoaldehyde and phenol.

*Corynebacterium alkanolyticum* resembles those belonging to *Corynebacterium hydrocarboclastus* or *Corynebacterium petrophilum*, however, it is distinguished from the latter two in view of the following characteristics.

choline 20, inositol 10, vitamin K 10, vitamin $B_{12}$ $10^{-3}$ milligram per liter of water.

(C) Casaminoacids plus tryptophane. A mixture of vitamin free casamino acids (commercially available, sold by Difco laboratories) 95 grams and 5 grams of tryptophane.
(D) Glucose
(E) Fructose
(F) Xylose
(G) Ribose
(H) Glycerol
(I) A mixture of (B) and (H)

Amounts of the additives relative to one liter of minimal medium:
(A) 100 milliliters
(B) 100 milliliters
(C) 1 gram
(D) 0.2 gram
(E) 0.5 gram
(F) 0.5 gram
(G) 0.5 gram
(H) 0.5 gram
(I) 100 milliliters of (B) and 0.5 gram of (H)

Cultural conditions:

Test tubes are filled with 5 milliliter aliquots of the minimal medium or minimal medium plus each of said additives other than the additive (B), and sterilized in an autoclave at 1 atmospheric pressure for 10 minutes. In case of the additive (B) the culturing medium is prepared by subjecting the additive to a Seitz filtration and adding

| | *Corynebacterium alkanolyticum* (IFO 12647) | *Corynebacterium hydrocarboclastus* | *Corynebacterium petrophilum* |
|---|---|---|---|
| Temperature (conditions) | 15° to 37° C., good growth at 37° C | 15° to 33° C., poor growth at 37° C | 15° to 35° C. |
| Litmus milk | Unchanged | Alkaline, litmus reduced | Unchanged. |
| Nitrates reduction | + | – | – |
| $H_2S$ production | + | – | –. |
| Size (microns) | 0.8 to 1.0 by 1.5 to 4.0 | 0.6 to 0.8 by 2.0 to 4.0 | 0.4 to 0.6 by 0.7 to 0.9. |

By way of example, the glycerol-requiring mutants obtained by the present inventors are, among others,

*Corynebacterium alkanolyticum* GL–21 (ATCC 21511)
*Corynebacterium hydrocarboclastus* GL–18 (IFO 21924)
*Corynebacterium hydrocarboclastus* GL–23 (ATCC 21512)

In the instant specification and claims, the designation IFO refers to the strain accession number at Institute for Fermentation Osaka in Osaka, Japan and the designation ATCC refers to the strain accession number at American Type Culture Collection, Rockville, Md., U.S.A.

The following are the results of studies on the nutrient requirements of these representative glycerol-requiring strains and of their parent strains.

Minimal medium:

5% n-paraffin mixture [1], 0.5% ammonium sulfate, 0.3% ammonium nitrate, 0.1% urea, 0.25% dipotassium phosphate, 0.1% potassium dihydrogenphosphate, 0.05% magnesium sulfate, 0.005% ferrous sulfate, 0.002% manganese sulfate, 0.01% calcium chloride.

Additives:

(A) A mixture of nucleic bases adenine, guanine, hypoxanthine, thymine, uracil, cytosine, 500γ each per milliliter of water.
(B) A mixture of vitamins: vitamin $B_1$ 2.0, vitamin $B_2$ 5.0, para-aminobenzoic acid 1.0, nicotinic acid 1.0, calcium pantothenate 1.0, pyridoxine 1.0, folic acid 0.1,

---

[1] The composition of the n-paraffin mixture is as follows:

| Hydrocarbon | Percent (v./v.) |
|---|---|
| $C_{12}H_{26}$ | 4.4 |
| $C_{13}H_{28}$ | 5.8 |
| $C_{14}H_{30}$ | 13.4 |
| $C_{15}H_{32}$ | 59.7 |
| $C_{16}H_{34}$ | 16.7 | thus sterilized additive to the autoclaved minimal medium. The test tubes are inoculated with test microorganisms and cultivation is effected at 28° C. for 4 days under shaking.

Thus obtained results are shown in Table 1, in which the sign (+) denotes that the particular microorganism grows on the corresponding additive agent and the sign (−) means that the particular microorganism does not grow on the corresponding additive agent.

TABLE 1

| | Assay microorganisms | | | |
|---|---|---|---|---|
| | *Corynebacterium alkanolyticum* | | *Corynebacterium hydrocarboclastus* | |
| Additives | Parent strain | GL–21 | Parent strain | GL–18 |
| Non | + | − | + | − |
| (A) | + | − | + | − |
| (B) | + | − | + | − |
| (C) | + | − | + | − |
| (D) | + | − | + | − |
| (E) | + | − | + | − |
| (F) | + | − | + | − |
| (G) | + | − | + | − |
| (H) | + | + | + | + |
| (I) | + | + | + | + |

Except that whereas the glycerol requiring mutants shown above require glycerol for their growth, parent strains do not require glycerol, their microbiological characteristics are identical with those of parent strains.

According to the method of the present invention, hydrocarbons, particularly normal paraffins, are employed as the main carbon source. Particularly preferable hydrocarbons are those having about 10 to 20 carbon atoms, and typical examples include tetradecane, hexadecane, octadecane, nonadecane, an n-paraffin mixture which boils in the range of 220° to 290° C., or the like.

There may of course be employed, in addition to the essential hydrocarbons, any other conventional carbon sources as exemplified by carbohydrates (e.g. glucose, starch, molasses, etc.), ethanol, acetic acid, fumaric acid, maleic acid, etc. The addition of a small amount of corn steep liquor or yeast extract is also effective.

The nitrogen source is selected from those which have hitherto been known as suitable for L-glutamic acid production, and is exemplified by ammonia, ammonium salts (e.g. ammonium sulfate, ammonium chloride, etc.), nitrates (e.g., ammonium nitrates, potassium nitrate, etc.), and urea are recommended.

If desired, to the culture medium are added inorganic salts (e.g., potassium dihydrogenphosphate, dipotassium phosphate, magnesium sulfate, ferrous sulfate, manganese sulfate, etc.), vitamins (e.g. vitamin $B_1$, vitamin $B_2$, para-amino benzoic acid, nicotinic acid, etc.) and other growth promoting materials (e.g. peptone, meat extract, etc.).

The culture medium may be used in any form, but a liquid medium is generally advantageous. When a liquid medium is employed, any of shaking cultural method, stirring cultural method, or the like may be adopted, though the so-called submerged aerobic cultural method is the most desirable for the industrial process.

The glycerol compounds to be employed in the method of the present invention include glycerol per se and its analogs which are usable for the mutants as a substitute for glycerol. Such analogs are exemplified by the corresponding phosphoric acid ester (e.g. glycerophosphoric acid, lecithin, cephalin, phosphatidylethanolamine, etc.), the corresponding fatty acid ester (e.g. mono-, di-, or tri-glyceride comprising of glycerol and such fatty acids as stearic acid, oleic acid, myristic acid, palmitic acid or the like, acetylated monoglyceride of above mentioned fatty acid, propylene glycol stearate, etc.), the corresponding halides (e.g. glycerol α-monochlorohydrin, glycerol-α,α'-dichlorohydrin, etc.), corresponding aldehyde (e.g. glyceraldehyde, etc.) and the corresponding carboxylic acid (e.g. glyceric acid, etc.).

Though the proportion of the glycerol compound in the culturing medium varies with other ingredients in the medium and/or the type of the culture method, the desirable range is usually from about 20 to 800γ per milliliter, more preferably 50γ to 500γ per milliliter, of the medium. It is to be noted that when the glycerol analog as mentioned above is employed, the amount should be calculated in terms of glycerol itself on the same molar basis. However, it is also to be noted that there exist such analogs that are not equivalent to the glycerol as a substitute for the latter. Among those exemplified hereinabove, di- or tri-glycerides of fatty acids may, for example, be required to be put in the medium in excess to the equimolar amount to that of the glycerol, and this abnormality depends partially on the esterase activities of the microorganism employed and partially on the kind of the employed glycerides themselves.

Furthermore, the glycerol compound may be added to the medium in one dose before the commencement of cultivation, or alternatively added in one dose or in several installments at opportune times during the cultivation period so that the total amount of glycerol or its analog may be in the said range.

The following are the results of studies on the relationship between the amount of the glycerol added to a simplified culture medium and the amount of the L-glutamic acid accumulated in the medium by the above-exemplified glycerol-requiring mutants.

A varying amount of glycerol was added to portions of a culture medium composed of 10% n-hexadecane, 3% ammonium sulfate, 0.25% dipotassium phosphate, 0.1% potassium dihydrogen phosphate, 0.05% magnesium sulfate, 0.005% ferrous sulfate and 0.002% manganese sulfate, and after being adjusted to pH 7.0, 20 milliliter aliquots of each medium are put into conical flasks of 200 ml. capacity. The flasks are sterilized at 120° C. for 10 minutes, calcium carbonate which has been previously sterilized at 150° C. for 4 hours is added to each flask in an amount that makes its concentration 4.0%. The inoculated media are cultured at 28° C. for 96 hours, during which time aqueous ammonia is added from time to time.

The results are shown in Table 2.

TABLE 2

| Glycerol added, γ/ml. | Assay microorganisms | |
|---|---|---|
| | Corynebacterium alkanolyticum (GL-21), mg./ml. | Corynebacterium hydrocarboclastus (GL-18), mg./ml. |
| 10 | 3.2 | 3.4 |
| 20 | 10.1 | 10.8 |
| 30 | 17.2 | 16.7 |
| 50 | 35.8 | 35.1 |
| 75 | 51.2 | 50.7 |
| 100 | 60.5 | 58.3 |
| 150 | 68.3 | 64.4 |
| 200 | 60.6 | 59.2 |
| 300 | 40.7 | 40.1 |
| 500 | 25.0 | 24.2 |
| 800 | 10.7 | 101.1 |
| 1,000 | 3.0 | 2.9 |

The following is a further example of the test results of the studies on the case where some glycerol analogs are employed for the glycerol.

According to the preceding description, *Corynebacterium alkanolyticum* GL-21 was cultivated in the same manner, using the glycerol analogs listed in Table 3 in place of glycerol itself. The results are shown in Table 3, in which added amounts of glycerol analogs are calculated in terms of glycerol.

TABLE 3

| Amount added, γ/ml. | Glycerol derivative | |
|---|---|---|
| | Glycerol α-monochlorohydrine, mg./ml. | Glyceraldehyde, mg./ml. |
| 10 | 3.1 | 2.5 |
| 20 | 9.3 | 8.1 |
| 30 | 15.3 | 13.1 |
| 50 | 30.2 | 27.4 |
| 75 | 50.3 | 45.1 |
| 100 | 57.2 | 53.1 |
| 150 | 62.4 | 58.2 |
| 200 | 57.1 | 52.1 |
| 300 | 35.4 | 34.2 |
| 500 | 21.2 | 20.3 |
| 800 | 9.8 | 8.8 |
| 1,000 | 2.5 | 1.3 |

Other cultural conditions for carrying out the process of the present invention may be conventionally selected according to the composition medium to be used, the sort of the cultural method and other factors.

However, in general, the pH of the cultural medium is from about 5 to 8, the temperature of cultivation is about 28° to 37° C., and the culturing period ranges from 2 to 5 days.

Through above mentioned procedures a substantial amount of L-glutamic acid is accumulated in the culturing medium, and thus produced L-glutamic acid is easily recovered from the culture broth by per-se known procedures.

For example, the bacterial cells are removed by filtration, and the broth may be advantageously treated by the purification means involving the use of an ion exchange resin, followed by concentration and crystallization or other suitable manners that are conventional per se.

Following are presently preferred illustrative embodiments of this invention.

The percentages of the ingredients of the culture medium are expressed in terms of the weight per volume basis (i.e. the weight in grams of the solute relative to 100 milliliters of the culture medium) unless otherwise noted.

EXAMPLE 1

An aqueous culture medium comprising 10% of an n-paraffin mixture,[2] 3.0% of ammonium sulfate, 0.25% of dipotassium phosphate, 0.1% of potassium dihydrogenphosphate, 0.05% of magnesium sulfate, 0.005% of ferrous sulfate, 0.002% of manganese sulfate, 0.001% of zinc sulfate and 0.015% of glycerol is adjusted to pH 7.0, and is sterilized at 120° C. for 10 minutes. To the medium is added calcium carbonate, that is previously sterilized at 150° C. for 4 hours, in an amount of 4.0%.

The culture medium is then inoculated with *Corynebacterium alkanolyticum* GL–21, and is incubated at 28° C. for 4 days under shaking, during which time suitable amounts of aqueous ammonia are added to maintain the medium in the pH range between 6.6 and 7.0. The procedure yields 70.1 milligrams of L-glutamic acid per milliliter of the culture broth.

From a 1-litre portion of the broth, both the cells and residual paraffin are removed and the L-glutamic acid is adsorbed on sulfonic acid-type cation exchange resin (Amberlite IR–120 (H-form), commercially available, sold by Rohm & Haas Company, U.S.A.), followed by elution with 0:1 N-aqueous ammonia. The eluate is concentrated under reduced pressure and brought to pH 3.2 by the addition of hydrochloric acid, whereupon crystals of L-glutamic acid separate. Yield 58 grams from 1-liter of the culture broth.

EXAMPLE 2

*Corynebacterium hydrocarboclastus* GL–18 is cultivated in the same manner as Example 1. The resulting broth contains 65 milligrams of L-glutamic acid per milliliter of the culture broth, followed by the same procedure described in Example 1, whereby 50 grams of L-glutamic acid is recovered from 1 liter of the broth.

EXAMPLE 3

An aqueous seed medium comprising 5% of the n-paraffin mixture employed in Example 1, 0.5% of ammonium sulfate, 0.3% of ammonium nitrate, 0.1% of urea, 0.25% of dipotassium phosphate, 0.1% of potassium dihydrogenphosphate, 0.05% of manganese sulfate, 0.005% of ferrous sulfate, 0.002% of magnesium sulfate, 0.1% of corn steep liquor and 0.03% of glycerol, is adjusted to pH 7.0.

The culture medium is then inoculated with *Corynebacterium alkanolyticum* GL–21, and thus inoculated medium is incubated in a tank at 28° C. for 24 hours. A 5 liter portion of the resulting seed culture is transferred to a (200 liter) tank containing 100 liters of a culture medium described in Example 1. To the medium is added calcium chloride, that is previously sterilized at 150° C. for 4 hours, in an amount of 0.1%.

---

[2] The composition of the n-paraffin mixture is as follows:

| Hydrocarbon | Percent (v./v.) |
|---|---|
| $C_{12}H_{26}$ | 4.4 |
| $C_{13}H_{28}$ | 5.8 |
| $C_{14}H_{30}$ | 13.4 |
| $C_{15}H_{32}$ | 59.7 |
| $C_{16}H_{34}$ | 16.7 |

The culture medium is then incubated at 30° C. under agitation at 250 r.p.m. and 40% aeration for 60 hours, during which time suitable amounts of aqueous ammonia are added to maintain the medium at the pH 7.0. The resulting broth contains 72 milligrams of L-glutamic acid per milliliter of the broth.

From 100 liters of the broth, 5.7 kilograms of L-glutamic acid is recovered by the procedure set forth in Example 1.

EXAMPLE 4

In a culture medium described in the Example 1 in which 0.015% of glycerol has been replaced by 0.002% of glyceraldehyde, *Corynebacterium alkanolyticum* GL–21 is cultured in the same manner as Example 1. During the cultural period of 96 hours, glyceraldehyde is added in several installments until the final concentration of glyceraldehyde is 0.015%. The procedure gives 55 milligrams of L-glutamic acid per milliliter of the culture medium. From 1 liter of the broth, 45 grams of L-glutamic acid is recovered by the procedure set forth in Example 1.

EXAMPLE 5

An aqueous culture medium comprising 10% of an n-paraffin mixture employed in Example 1, 0.2% of corn steep liquor, 0.1% of yeast extract, 2% of ammonium sulfate, 0.5% of potassium hydrogenphosphate, 0.2% of potassium dihydrogenphosphate, 0.05% of magnesium sulfate, 0.005% of ferrous sulfate, 0.002% of manganese sulfate, 0.001% of zinc sulfate and 0.03% of glycerol is adjusted to pH 7.0, is sterilized at 120° C. for 10 minutes. To the medium is added calcium carbonate, that is previously sterilized at 150° C. for 4 hours, in an amount of 4.0%.

The culture medium is then inoculated with *Corynebacterium hydrocarboclastus* GL–23, and the cultivation is carried out in the same manner as in Example 1. The resulting broth contains 66 milligrams of L-glutamic acid per milliliter of the culture broth, followed by the same procedure set forth in Example 1, whereby 51 grams of L-glutamic acid is recovered from 1 liter of the broth.

What is claimed is:

1. A method for producing L-glutamic acid, which comprises culturing an L-glutamic acid-producing microorganism which requires glycerol for its growth and belongs to the genus Corynebacterium in a culture medium containing normal paraffin as the main carbon source together with nitrogen source, inorganic salts and a glycerol compound under aerobic conditions until a substantial amount of L-glutamic acid is accumulated therein, and recovering the L-glutamic acid from the culture broth.

2. A method as claimed in claim 1, wherein the microorganism is *Corynebacterium alkanolyticum*.

3. A method as claimed in claim 1 wherein the microorganism is *Corynebacterium hydrocarboclastus*.

4. A method as claimed in claim 2 wherein the microorganism is *Corynebacterium alkanolyticum* GL–21 (ATCC 21511).

5. A method as claimed in claim 3 wherein the microorganism is *Corynebacterium hydrocarboclastus* GL–23 (ATCC 21512).

6. A method as claimed in claim 1 wherein the amount of the glycerol compound is about 20 to 800γ per milliliter in terms of glycerol.

7. A method as claimed in claim 1 wherein the glycerol compound is glycerol.

8. A method as claimed in claim 1 wherein the glycerol compound is a glycerol phosphoric acid ester.

9. A method as claimed in claim 1 wherein the glycerol compound is a glycerol fatty acid ester.

10. A method as claimed in claim 1 wherein the glycerol compound is an aldehyde corresponding to glycerol.

11. A method as claimed in claim 1 wherein the glycerol compound is a carboxylic acid corresponding to glycerol.

12. A method as claimed in claim 1 wherein the glycerol compound is a halide corresponding to glycerol.

13. A method as claimed in claim 10 wherein the aldehyde is glyceraldehyde.

14. A method as claimed in claim 12 wherein the halide is glycerol-$\alpha$-mono-chlorohydrin.

15. A method as claimed in claim 1, wherein normal paraffin contains from 10 to 20 carbon atoms.

References Cited

UNITED STATES PATENTS 3,406,095  10/1968  Otsuka et al. _____ 195—28 R

A. LOUIS MONACELL, Primary Examiner

G. M. NATH, Assistant Examiner

U.S. Cl. X.R.

195—49